United States Patent [19]

Kimberley

[11] Patent Number: 4,924,620
[45] Date of Patent: May 15, 1990

[54] FLOATS FOR FISHING LINES

[76] Inventor: John B. Kimberley, 35 Linda Street, Hornsby, New South Wales 2077, Australia

[21] Appl. No.: 339,131

[22] Filed: Apr. 14, 1989

[30] Foreign Application Priority Data

Apr. 15, 1988 [AU] Australia ................. PI7779

[51] Int. Cl.$^5$ .............................................. A01K 97/02
[52] U.S. Cl. .................................... 43/44.9; 43/44.99
[58] Field of Search ................... 43/44.9, 44.91, 44.99

[56] References Cited

U.S. PATENT DOCUMENTS

| | | | |
|---|---|---|---|
| 2,612,718 | 10/1952 | Steinberg | 43/44.99 |
| 2,844,907 | 7/1958 | Merton | 43/44.99 |
| 2,910,798 | 11/1959 | Bias | 43/44.9 |
| 3,608,229 | 9/1971 | Ross | 43/44.9 |
| 3,769,740 | 11/1973 | Lang | 43/44.99 |
| 3,974,591 | 8/1976 | Ray | 43/44.91 |

FOREIGN PATENT DOCUMENTS

| | | | |
|---|---|---|---|
| 907251 | 3/1946 | France | 43/44.99 |
| 1041466 | 10/1953 | France | 43/44.99 |
| 949358 | 2/1964 | United Kingdom | 43/44.99 |
| 1224987 | 3/1971 | United Kingdom | 43/44.9 |

*Primary Examiner*—Kurt Rowan
*Attorney, Agent, or Firm*—Edwin D. Schindler

[57] ABSTRACT

A fishing line float having a body with two compartments one of which is a buoyancy compartment and the other is a temporary ballasting compartment with wall perforations to allow water dispersable ballasting material to be loaded thereinto and the ballasting material to be purged therefrom by water action after the float has been cast with the fishing line and hook.

10 Claims, 2 Drawing Sheets

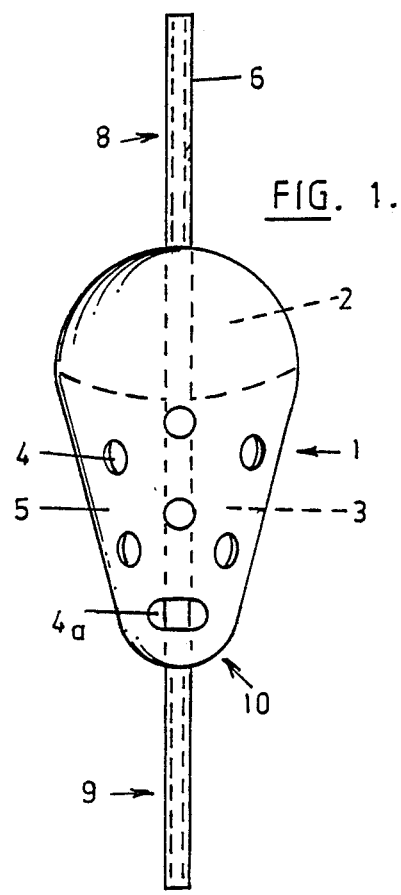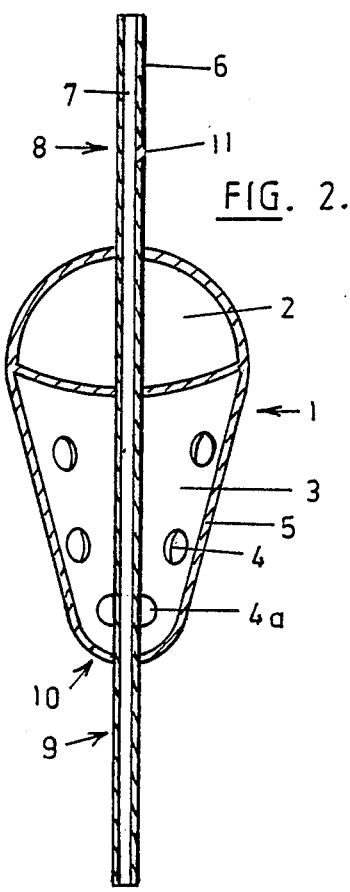

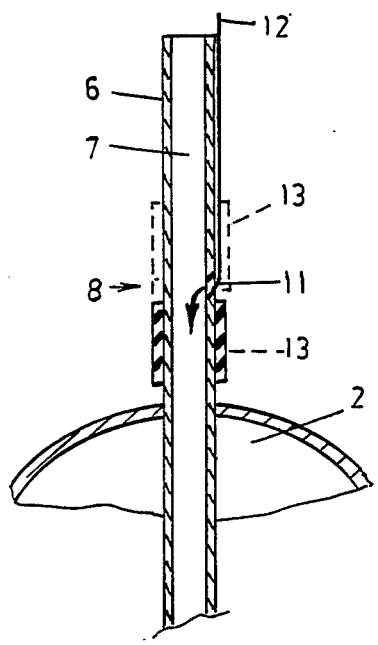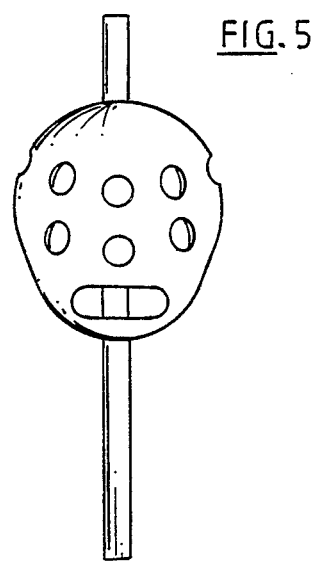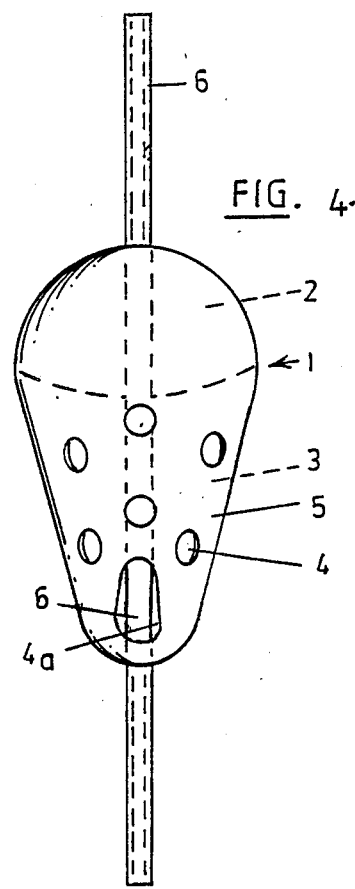

FLOATS FOR FISHING LINES

This invention relates to floatation devices, termed floats for short, for use in association with fishing lines. Floats have several purposes, for example, the weight of the float assists an angler when casting the hooked line, its bouyancy allows the angler to suspend a baited hook a desired distance below the water surface whilst remaining sufficiently visible to allow an angler to detect the strike of a fish on the hook fixed to the line.

Many forms of float have been developed over the years and various sizes in each form are usually available. The material of manufacture has typically been wood, cork or plastic foam material.

There is usually a stem associated with the float to which the fishing line is attached. The stems are conventionally made from a plastic material, cane or metal, e.g. aluminium. The float and/or the stem portion which rides above the water when the float is in use is usually painted a distinctive and bright colour to assist the angler to note movements of the float consistant with the strike of a fish on the fishing hook.

It has been the practice to have specialised floats for different use conditions. Smooth water floats without lead weight are common. For broken water floats larger than those adopted for smooth water have been favoured to give greater bouyancy, often lead is attached to the float to provide weight to assist in casting greater distances and create a neutral bouyancy condition for the float when in use.

Existing float types have certain desirable characteristics which can vary depending on, for example, the waters being fished. Universally however they should be of a streamlined shape to minimise drag through the air when they are cast with the hook and bait. They need to have a weight and bouyancy which will allow the float to ride in the water at a suitable height and are therefore usually reasonably light in weight. On the other hand the weight of the float and its size, which are factors in the air resistance to casting, have an effect on the distance the float can be cast.

To this time it has frequently been a matter of compromise between the weight of the float and the distance it can be cast. The object of this invention is to eliminate the need to compromise and to that end there is provided a float which has the desirable features of bouyancy and light weight, to ensure snesitivity of the float to any movement of the hook by a fish, but also has a weight which will allow the hook and bait to be cast a maximum distance commensurate naturally with the skill of the angler. This has been achieved by providing a float the weight of which can be varied. To achieve the objectives of this invention there is provided a fishing line float comprising a substantially symmetrical body having two zones with an axis of float symmetry passing through both zones from one end of said float to the other end of said float, one of said zones is a bouyancy zone to provide bouyancy for the float when in use and the other zone is in the form of a chamber which is closed except for wall perforations whereby said chamber can be loaded with material to weight the float and/or attract fish to the vicinity of the float when in use and through which said material can be dispersed by water action when the float is in use, and means for mounting said float on a fishing line.

Several examples of the invention will now be described with reference to the accompanying drawings in which:

FIG. 1 is a front elevation of one form of the float of the invention,

FIG. 2 is a sectional elevation of the float shown in FIG. 1,

FIG. 3 is an enlarged sectional elevation of portion of the float stem showing one way to couple a float to a fishing line, FIG. 4 is a front elevation of a second form of the invention and FIG. 5 is a front elevation of a third form of the ivention.

All of the floats to be described have the common feature that there is a body with a bouyancy zone and a second zne which is in the form of a perforated wall chamber. As illustrated in FIGS. 1 and 2 the float body is indicated 1, the upper bouyancy zone is indicated 2 and the chamber 3 has perforations 4 in its walls 5. The bouyancy zone 2 is illustrated as a hollow body but it can be filled with a bouyancy material, e.g. foamed plastics material or cork or the like. There is a tubular float stem 6 with a bore 7 extending through both the bouyancy zone 2 and the chamber 3 and extends as indicated 8 and 9 from one end and the other end of the float body 1.

It will be noted from FIGS. 1 and 2 that the perforations 4a adjacent the end of the chamber remote from the bouyancy zone 2 are much larger than the perforations 4. The perforations 4a being larger allow material for ballast (for example wet sand) and for fish attraction, known as "berley", to readily exit the chamber due to water action when the float is in use. The perforations 4 and 4a allow water to enter the chamber 3 and the water action fluidises the material in the chamber resulting in its discharge through the perforations 4 and 4a.

FIG. 4 illustrates another form of perforation 4a.

As illustrated in FIG. 3 the bore 7 of the float stem 6 has a fishing line feed hole 11 to allow a fishing line to be entered into the bore 7 from outside the stem 6, in the direction indicated by the arrow. The axis of the hole 11 lies at an acute angle to the axis of the bore 7 and is outwardly divergent away from the stem bore 7 in a direction away from the float body 1. As will be understood this facilitates the entry of the fishing line 12 into the stem bore 7. The preferred position for the feed hole 11 is adjacent the bouyancy zone 2, as illustrated.

The retain the float in a fixed position on a fishing line passing through the hole 11 and the stem bore 7, and beyond to be fitted with a sinker (if desired) and a hook (not shown), a clamping sleeve 13 is fitted to the outside of the stem 6. The sleeve 13 is preferably made of an elastic material so that when pushed from the full line position in FIG. 3 to the dotted line position in FIG. 3 it will stretch sufficiently to accomodate the fishing line 12 and resiliently clamp it against the exterior of the stem 6.

FIG. 5 illustrates another form of the float which is of a ball shape and it is to be understood that for different fishing conditions floats of different physical shape can be provided. All of the floats however have the essential features set forth in the claims appended hereto.

Whilst the preferred forms of the invention have the float stem 6 projecting from both ends of the float body 1 it is to be understood that this is not always necessary. Floats with substantially no stem projection beyond the ends of the float body can be made and the means of positioning the float on a fishing line can be varied from the method involving the elastic sleeve described above. It is also possible to have a stem projecting from one end only of the float body 1, preferably the bouyancy zone end.

In a variation of the invention illustrated and described the perforations 4a are located a distance "above" the end 10 of the body 1 sufficient to provide a reservoir or trap for ballasting material, sand and/or berley, a residue which will not be dislodged by water action and will be retained to provide a ballasting effect for the float and a neutral bouyancy condition for the float.

In use the float would be mounted on a fishing line a required distance above the hook and the hook would be baited. The float would then be "loaded" with sand and/or berley by pressing it through the perforations into the chamber 3. The loaded float and the hook and bait would then be cast. When the float hits the water the chamber 3 would be rapidly purged of the sand or the berley contained therein. Where there was a ballasting trap at the end 10 of the body the retained residue provides ongoing ballast for the float and in the case of berley ongoing attraction for fish. Naturally a mix of sand and berley, or any other suitable ballasting material can be used as required.

It is to be noted that the bouyancy zone 2 has convexly formed upper and lower surfaces. This facilitates the movement up and down of the float in the water under working conditions. The convexly curved lower face of the chamber and the alignment of the holes 4 closely adjacent the junction of the lower faces with the wall 5 ensures that no air pocket can form below the lower faces thereby producing additional undesirable bouyancy.

The foregoing are to be considered as only representative examples of the float of the invention. The broad aspects of the invention are a float which comprises a flotation portion for buoyancy and a perforated chamber to allow casting ballast to be added rapidly automatically purged of material by water action.

I claim:
1. A fishing line float, comprising:
   a substantially symmetrical body having two chambers with an axis of float symmetry passing through both chambers from one end of the float to the other end of the float, one of said chambers being a closed buoyancy chamber to provide buoyancy for the float when in use and the other chamber is a ballast chamber which is closed except for wall perforations comprising a plurality of purging perforations adjacent said other end of said float and remote from said buoyancy chamber and substantially larger in size than other perforations in said ballast chamber wall disposed between the purging perforations and said buoyancy chamber, said perforations allowing the ballast chamber to be loaded with material to temporarily weight the float and/or attract fish to the vicinity of the float when in use and allowing said material to be dispersed by water action when the float is in use; and,
   means for mounting said float on a fishing line.
2. The float as claimed in claim 1, wherein the means for mounting the float on a fishing line includes an elongated float stem which passes through both of said chambers, said float stem having a through bore substantially co-axial with said axis of symmetry of said float.
3. The float as claimed in claim 2, wherein said stem projects from one of the ends of said float.
4. The float as claimed in claim 2, wherein said stem projects from both of the ends of said float.
5. The float as claimed in claim 3, including a fishing line feed hole extending through a wall of the float stem from the bore thereof to the exterior of the float stem.
6. The float as claimed in claim 4, including a fishing line feed hole extending through a wall of the float stem from the bore thereof to the exterior of the float stem.
7. The float as claimed in claim 5, wherein the axis of the fishing line feed hole lies at an acute angle to the axis of the bore of the float stem and outwardly diverges away from said float stem bore in a direction away from said float body.
8. The float as claimed in claim 6, wherein the axis of the fishing line feed hole lies at an acute angle to the axis of the bore of the float stem and outwardly diverges away from said float stem bore in a direction away from said float body.
9. The float as claimed in claim 5, including a line clamping sleeve frictionally engaging and movable along the exterior of said float stem exterior to said float and sufficiently elastic to enlarge to pass over a fishing line extending along and lying against the exterior of said float stem.
10. The float as claimed in claim 6, including a line clamping sleeve frictionally engaging and movable along the exterior of said float stem exterior to said float and sufficiently elastic to enlarge to pass over a fishing line extending along and lying against the exterior of said float stem.

* * * * *